Oct. 14, 1947.  H. J. MURRAY  2,429,069
ELECTRICAL CIRCUIT CONTROLLER
Filed Oct. 20, 1943   3 Sheets-Sheet 1

INVENTOR
HOWARD J. MURRAY
BY Owen W. Kennedy
ATTORNEY

Oct. 14, 1947.   H. J. MURRAY   2,429,069
ELECTRICAL CIRCUIT CONTROLLER
Filed Oct. 20, 1943   3 Sheets-Sheet 2

INVENTOR
HOWARD J. MURRAY
BY Owen W. Kennedy
ATTORNEY

Oct. 14, 1947.  H. J. MURRAY  2,429,069
ELECTRICAL CIRCUIT CONTROLLER
Filed Oct. 20, 1943  3 Sheets-Sheet 3

INVENTOR
HOWARD J. MURRAY
BY Owen W. Kennedy
ATTORNEY

Patented Oct. 14, 1947

2,429,069

UNITED STATES PATENT OFFICE 2,429,069

ELECTRICAL CIRCUIT CONTROLLER

Howard J. Murray, New York, N. Y., assignor to Signal Engineering & Manufacturing Company, New York, N. Y., a corporation of Massachusetts Application October 20, 1943, Serial No. 506,925

2 Claims. (Cl. 200—146)

1

The present invention relates to electrical circuit controllers such as relays, circuit breakers, and various other types of contactors, and has for its object to provide an improved contact structure for devices of this character that is adapted to handle the flow of heavy electrical currents with sustained contact pressure and without destructive arcing.

The contact structure of the present invention relates particularly to circuit controllers of the type employing a contact arm adapted by its movement to carry contacts into and out of engagement with cooperating stationary contacts. In relay devices as heretofore constructed, the rate of approach or separation with respect to the relatively movable contacts has been determined by the rate of movement of the contact carrying arm, usually under the control of electromagnetic operating means. According to the present invention, there is provided a contact structure characterized by the provision of current carrying elements adapted to move together or apart with a velocity appreciably greater than the normal rate of movement of the actuating arm which carries the contact elements. The above and other advantageous features of the invention will hereinafter more fully appear from the following description considered in connection with the accompanying drawings, in which:

2

Figure 13:
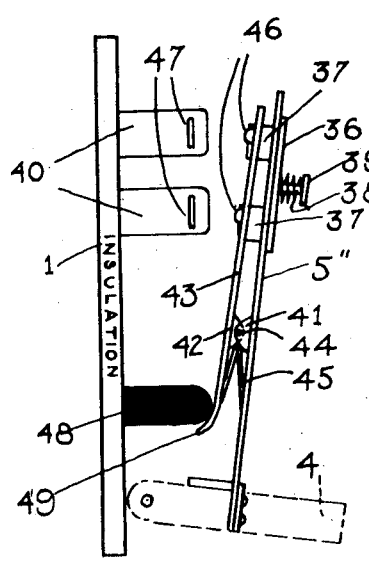
Figure 14:
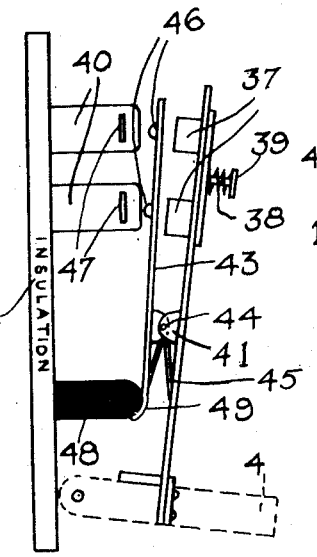
Figure 15:
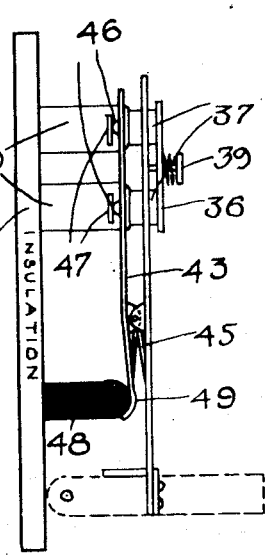

Figs. 13, 14 and 15 illustrate a further modification of the invention, in different positions of operation.

Figure 16:
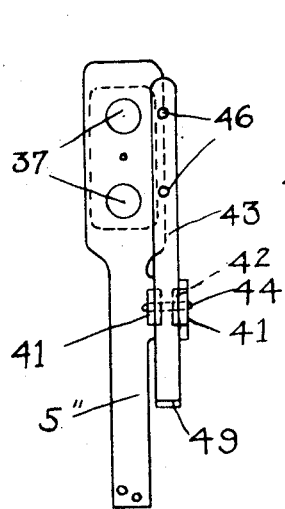

Fig. 16 is an elevation of the movable contacts shown in Fig. 13, as viewed from in front of the stationary contacts.

Figure 17:
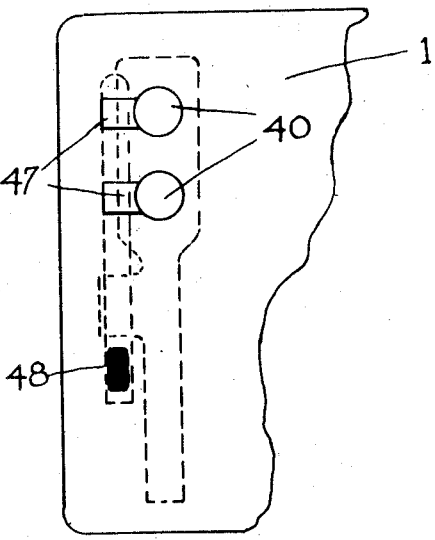

Fig. 17 is a front elevation of the stationary contacts shown in Fig. 13.

Figure 1:
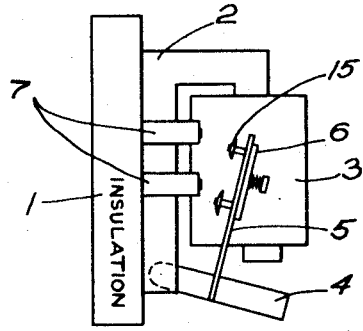
Fig. 1 is a view in side elevation of a circuit controller embodying the invention, with the contacts in non-current carrying position.
Figure 2:
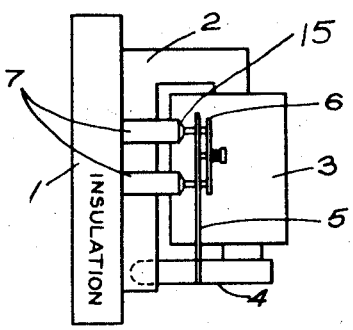
Fig. 2 is a view similar to Fig. 1, showing the contacts in current carrying position.

Referring first to Figs. 1 and 2, the invention is shown for purposes of illustration as being embodied in a circuit controller of the relay type, such, for example, as is shown in Patent No. 2,082,794, issued June 8, 1937. The essential elements of this relay comprise an insulating base 1 carrying a magnetic core 2, one leg of which is surrounded by an energizing winding 3 and a magnetic armature 4, pivotally supported at the lower end of the other core leg. The armature 4 is adapted to be raised upon energization of the winding 3 and held in the position of Fig. 2, with deenergization of winding 3 permitting the armature 4 to fall back into the position of Fig. 1 under the influence of gravity or by spring action, if desired. The armature 4 carries one or more upwardly extending arms 5, and each arm 5 is provided at its free end with a contact structure embodying the present invention and generally designated by the reference character 6. The contact structure 6 is adapted to cooperate with spaced stationary contacts 7 mounted on the base 1, although, as will later appear, the contact structure will function equally as well with stationary contacts arranged other than as shown.

Figures 3, 4, 5:
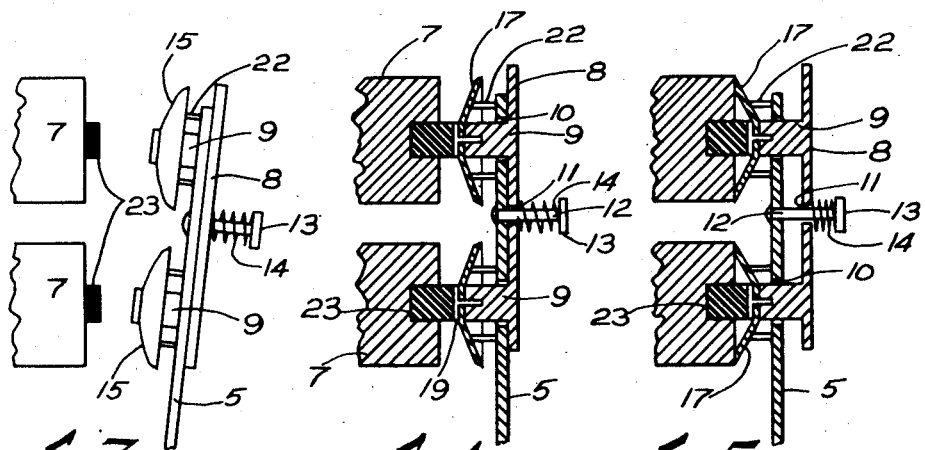
Fig. 3 is a fragmentary view showing the contacts of Fig. 1 on an enlarged scale.
Fig. 4 is a sectional view showing the contacts of Fig. 3 in an intermediate stage of their movement into current carrying position.
Fig. 5 is a sectional view similar to Fig. 4, showing the contacts fully engaged.
Figures 7, 8:
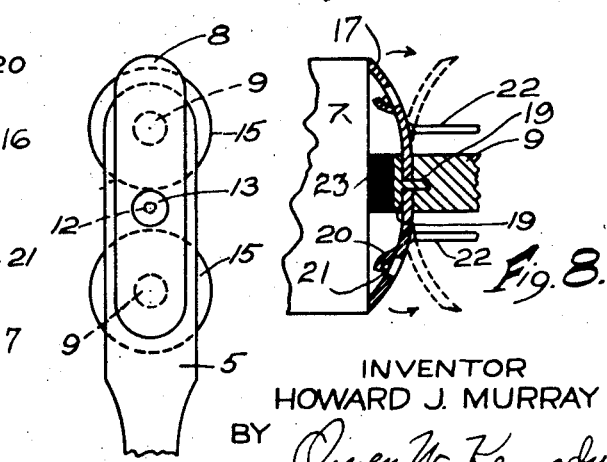
Fig. 7 is a fragmentary view in front elevation, showing the contact structure of Fig. 3 as viewed from the right.
Fig. 8 is a diagrammatic view illustrating the functioning of the contact element of Fig. 6, in different positions.

As best shown in Figs. 4 and 7, the contact structure 6 consists of a plate 8 carrying a pair of contact posts 9 having substantially the same spacing as the stationary contacts 7. The contact posts 9 extend through openings 10 provided in the upper end of the arm 5, which openings 10 are of appreciably larger diameter than the posts 9. The plate 8 also provides a central opening 11 which freely receives a pin 12 mounted on the arm 5 between the openings 10. The free end of the pin 12 provides a head 13, and a spring 14, surrounding the pin 12 between the head 13 and the plate 8, exerts a pressure tending to yieldingly maintain the plate 8 in engagement with the arm 5, as shown in Fig. 3.

Figure 6:
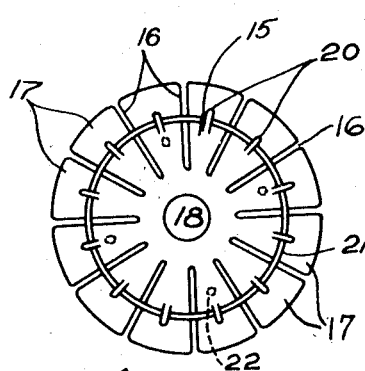
Fig. 6 is a plan view of one of the quick-acting contact elements embodying the invention.

Each contact post 9 carries a resilient contact disk 15 which, as best shown in Fig. 6, is circular in form and provides a plurality of radial slots 16 to form separate fingers 17. The disk 15 provides a circular opening 18 for receiving the shank of a contact head 19 by means of which the disk 15 is secured to its post 9. Each finger 17 of the disk 15 provides a punched out lug 20 offset from the plane of the disk, and a resilient element 21 is in engagement with all of the lugs 20. Since the resilient element is continuous and tends to contract with respect to the central axis of the disk, the several fingers 17 are normally held in either the full or dotted line positions of Fig. 8. That is to say, the fingers 7, by reason of their resiliency, will tend to assume a dished arrangement facing towards one side or the other of the central portion of the disk which is fastened to the contact post 9.

For the purpose of moving the fingers 17 between the extreme positions of Fig. 8, the arm 5 provides a number of actuating rods 22 secured at their ends to the fingers 17. Therefore, relative movement between the arm 5 and the plate 8 carrying a contact post 9 will cause the rods 22 to move the fingers 17 with respect to the central portion of the disk which is fixed to the contact post. Since, as previously pointed out, the spring 14 normally tends to maintain the plate 8 in engagement with the arm 5, the fingers 17 are normally dished towards the arm 5 when the relay is in its non-energized condition, and the arm 5 occupies the position of Fig. 3.

When energization of the winding 3 attracts the armature 4, the resulting movement of the arm 5 in the direction of the stationary contact 7, causes the contact heads 19 to engage projecting studs 23 of insulating material located centrally of each contact 7, as shown in Fig. 4. When this occurs, further movement of the plate 8 carrying the posts 9 is prevented, although the arm 5 is free to continue its movement with the armature 4 by reason of the compressibility of the spring 14. Therefore, as soon as movement of the contact posts 9 is arrested, the rods 22 carried by the arm 5 will throw the disk fingers 17 from the position of Fig. 4 to the position of Fig. 5, wherein the fingers are in engagement with the stationary contacts 7 within an annular zone surrounding each stud 23.

By reason of the tendency of the fingers 17 to assume a dished arrangement in one extreme position or the other, the throw-over from the position of Fig. 4 to the position of Fig. 5 occurs with a rapid snap action immediately following engagement of the contact heads 19 with the stationary contact studs 23. Furthermore, it is apparent that movement of the fingers 17 occurs at a rate very much greater than the rate of movement of the arm 5, since the fingers 17 undergo their entire displacement while the rods 22 are moving through a relatively short distance represented by only a portion of the final displacement between the arm 5 and plate 8, as shown in Fig. 5.

When movement of the arm 5 causes the contact heads 19 to engage the fixed insulating studs 23, as shown in Fig. 4, this engagement is almost immediately followed by the rapid throw-over of the fingers 17, thereby establishing a circuit for the flow of current between contacts 7. Therefore, the resilient fingers 17 will tightly engage the contacts 7 all the time that current is flowing, and the sustained pressure of the dished fingers 17 will effectually prevent any arcing between the engaged contact surfaces, even though the force on the arms may vary as a result of fluctuations of voltage applied to the winding 3.

When in response to deenergization of the winding 3, the armature 4 falls away from the core, the arm 5 will start to move from the position of Fig. 5 to the position of Fig. 4. When this occurs, the rods 22 will move the fingers 17 away from the contacts 7 with a snap-over action similar to that which occurred when moving the fingers in the opposite direction. Therefore, the fingers 17 will leave the surfaces of the contacts 7 at a rate of movement greatly in excess of the rate of movement of the arm 5 as it moves with the armature 4 under the influence of gravity, thereby reducing arcing to a minimum.

Figure 9:
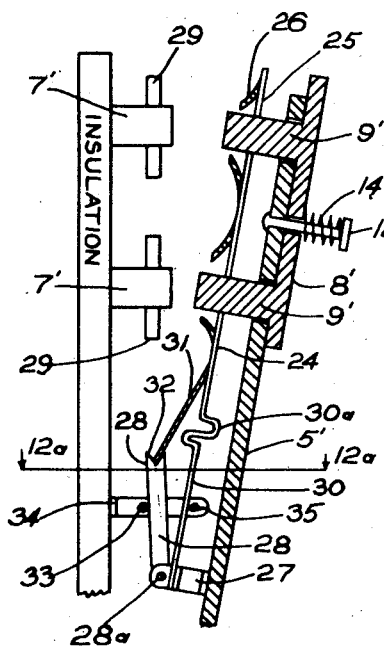
Figs. 9, 10 and 11 illustrate a modified form of contact structure, in different positions.
Figure 12:
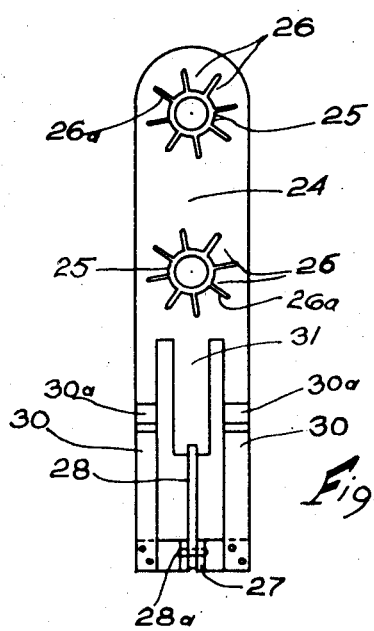
Fig. 12 is a view in front elevation of the modified form of contact member shown in Fig. 9.
Figure 12A:
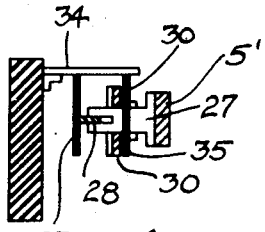
Fig. 12a is a section along the line 12a—12a of Fig. 12.

Referring now to Figs. 9 and 12, there is shown a modification of the above described construction, wherein the making or breaking of the circuit is taken care of by the resilient fingers of a snap action contact member, while non-resilient contact members of heavy current carrying capacity provide the main current conducting path of the controller during so-called "steady state" condition of the same. In this modified showing, the same reference numerals are applied to the parts corresponding to elements previously described with reference to Figs. 1 to 5 inclusive.

Referring first to Fig. 9, the relatively stiff arm 5' which is movable with the relay armature carries a plate 8' on which is mounted a pair of solid contact posts 9'. The spacing of these posts 9' corresponds to the spacing of stationary contacts 7' mounted on an insulating base. The contact posts 9' extend through openings in the arms 5', and the plate 8' provides an opening freely receiving a pin 12' mounted on the arm, with a spring 14' serving to yieldingly maintain the plate 8' in engagement with the arm 5'. The cross sectional areas of the stationary contacts 7', posts 9', and connecting plate 8' are such as to provide sufficient current carrying capacity for the flow of heavy current after these contacts have been closed, and the purpose of the invention in this modified form, is to make and break the current by quick acting auxiliary contact fingers operating on the same principle as those previously described.

To this end, the arm 5' also carries a contact member 24 on the side opposite to the plate 8', this member 24 providing openings 25 through which pass the main contact posts 9'. Each opening 25 is surrounded by a series of resilient fingers 26, formed by cutting slots 26a radiating from the center of each opening and bending the metal between the slots outwardly. The contact member 24 is carried by a bracket 27 mounted on the arm 5' and an actuating lever 28 is pivotally mounted at 28a on the bracket 27, so that the member is adapted to be moved by the lever 28 to snap the fingers 26 into or out of engagement with a contact ring 29 surrounding each stationary contact 7'.

The snap action of the member 24 is obtained by constructing this member as shown in Fig. 12, with a pair of resilient arms 30 providing doubled loops 30a located near the point of attachment of the member 24 to the bracket 27. The member 24 also provides a tongue 31 extending between the arms 30, with the free end of the tongue 31 received in a notch 32 provided at the end of the lever 28. With the parts in the position of Fig. 9, the end of the tongue 31 is disposed to the left of the resilient arms 30, so that the tongue 31 exerts a thrust on the whole contact member, tending to bias the free end of the member to the right.

With the arm 5' in the position of Fig. 9, i. e., with the relay armature in its dropped back position of Fig. 1, the lever 28 bears on a stop 33 mounted on a bracket 34 carried by the base 1. Therefore, when energization of the winding 3 causes the armature to pull in, the initial movement of the arm 5' results in the stop 33 turning the lever 28 in a clockwise direction about its pivot 28a. As this turning movement progresses, the loops 30a in the arm 30 permit a certain amount of elongation of the contact member under the thrust of the tongue, and when the apex of the notch 32 passes the plane of the arms 30, the tongue 31 exerts a thrust which throws the member from the position of Fig. 9 to the position of Fig. 10, with a quick snap action.

Figure 10:
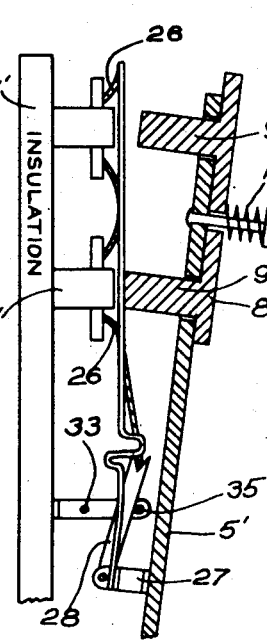
Figure 11:
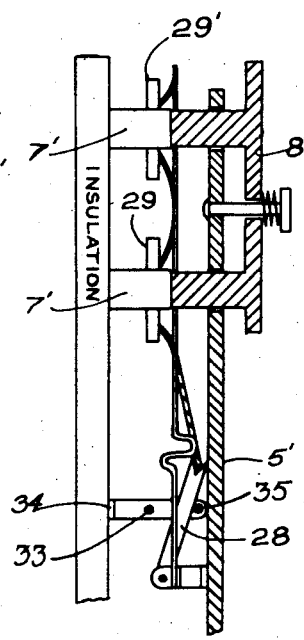

When this occurs, the two series of resilient fingers 26 engage the rings 29 surrounding each stationary contact 7', and it is apparent from Fig. 10 that this engagement takes place while the arm 5' is still moving to the left, and before the contact posts 9' have engaged the stationary contacts 7'. There is thus established, with a quick snap action, a path for the flow of current between contacts 7' in advance of engagement of the posts 9' with these contacts, which takes place when the armature is fully pulled in as shown in Fig. 11. It is to be noted that the main flow of current is then through the contact posts 9' and plate 8', with the plate 8' then separated from the arm 5', due to yielding of the spring 14'. This corresponds to the steady state condition of the relay.

With the parts occupying the position of Fig. 11, the lever 28 bears on a second stop 35 carried by the bracket 34, so that when the armature starts to drop back upon deenergization of the winding 3, the fixed stop 35 exerts a force tending to turn the lever 28 in a counter-clockwise direction. As soon as the turning of the lever 28 causes the apex of the notch 32 to pass the plane of the arms 30, the thrust of the tongue quickly snaps the contact member from the position of Fig. 11 to the position of Fig. 9, thereby disengaging the fingers 26 from the rings 29. Since this disengagement takes place after the contact posts 9' leave the contacts 7', the circuit is finally broken at a high rate of contact separation following separation of the main contact members at a slower rate. Therefore, both making and breaking of the circuit is taken care of by the resilient contact fingers 26 in cooperation with the rings 29, while the non-resilient contact members of heavy current carrying capacity provide the main current conducting path of the device during its steady state, or pulled in condition of Fig. 2.

Referring now to Figs. 13 to 17 inclusive, there is shown a further modification of the contact structure, wherein the relatively stiff arm 5", which is movable with the relay armature 4, carries a plate 36 on which is mounted a pair of spaced contacts 37 yieldingly held in position by a spring 38 surrounding a pin 39 and pressing on the plate. The spacing of the contacts 37 corresponds to the spacing of stationary contacts 40 mounted on the base 1. The operation of the contacts 37 and plate 36 in bridging the stationary contacts 40 in response to movement of the armature 4 is substantially the same as described in the aforementioned Patent No. 2,082,794.

The contact arm 5" provides ears 41 between which are received corresponding ears 42 provided on an auxiliary contact arm 43, with the ears being connected by a pivot pin 44. A spring 45 yieldingly maintains the arm 43 in the position of Fig. 13, wherein a pair of contacts 46 carried by the arm are opposed to lugs 47 extending laterally from the stationary contacts 40. As best shown in Fig. 16, that portion of the arm 43 carrying the contacts 46 is offset from the arm 5" carrying the main contacts 37, so that the arm 43 can turn about its pivot 44 independently of the arm 5".

The base 1 provides a post 48 of insulating material extending in the direction of a curved operating portion 49 of the auxiliary contact arm 43, with the post 48 and the portion 49 being slightly spaced from each other when the parts occupy the position of Fig. 13. However, when energization of the winding 3 pulls up the armature 4, the initial movement of the arm 5" causes the portion 49 to engage the post 48, thereby turning the arm 43 about the pivot 44 with a quick action in advance of engagement of the main contacts 37 with the stationary contacts 40. The position of the auxiliary contact arm 43 just after being actuated by the post 48 is shown in Fig. 14, from which it is apparent that the contacts 46 on this arm are about to engage the lugs 47 on the contacts 40.

As a result of the advance turning movement of the auxiliary contact arm 43, the contacts 46 will engage the lugs 47, as shown in Fig. 15, before the main contacts 37 and 40 are engaged. There is thus established and maintained under pressure a path for the flow of current between stationary contacts 40 in advance of the engagement of the main contacts 37 which takes place when the armature is fully pulled in. After that the main flow of current is through the contacts 37 and 40 which corresponds to the steady state condition of the relay.

Upon deenergization of the winding 3 and dropping back of the armature 4, the contacts 46 will be held in engagement with the lugs 47 by the post 48 until after the main contacts 37 and 40 have separated from each other due to the flexure of portion 49 in the closed position of the relay. The final break in the circuit does not occur until the post 48 is free of the portion 49, after which the compressed spring 45 rapidly turns the auxiliary arm 43 about its pivot 44 as the main arm 5" reaches the position of Fig. 13. The above described modification therefore represents an embodiment of the invention that can be readily applied to an existing relay provided with contacts constructed in the manner shown in the aforementioned Patent No. 2,082,794.

From the foregoing, it is apparent that by the present invention there is provided a contact structure characterized by the provision of current carrying elements adapted to move together, or apart, with a velocity appreciably greater than the normal rate of movement of the actuating arm which carries these elements.

I claim:

1. A contact structure for electrical circuit controllers comprising in combination a stationary contact, an actuating member movable toward or away from said stationary contact through a predetermined distance, a main contact movable with said actuating member with respect to said stationary contact, a contact carrying element yieldably mounted on said actuating member and movable therewith, said element providing a resilient current carrying portion movable between said stationary contact and said actuating member, and a connection between the current carrying portion of said element and said actuating member for moving said current carrying portion into or out of engagement with said stationary contact, with a snap action and with a velocity appreciably greater than the normal rate of movement of said actuating member and said main contact toward or away from said stationary contact.

2. A contact structure for electrical circuit controllers comprising in combination spaced stationary contacts, a pivotally mounted arm movable toward or away from said stationary contacts, said arm providing spaced openings axially alined with said stationary contacts, a plate yieldingly mounted on said arm and carrying spaced contacts extending through said arm openings in the direction of said stationary contact, an element mounted on said arm provided with yieldable fingers surrounding each of said plate carried contacts, and connections between said arm and said element for throwing said fingers either into or out of engagement with said stationary contacts with a snap action in response to movement of said arm, with such movement of said fingers being in the same direction as movement of said arm and at a greater rate.

HOWARD J. MURRAY.

REFERENCES CITED

The following references are of record in the file of this patent:

UNITED STATES PATENTS

| Number | Name | Date |
| --- | --- | --- |
| 1,939,286 | Spencer | Dec. 12, 1933 |
| 1,935,428 | Atwood | Nov. 14, 1933 |
| 1,678,407 | Spencer | July 24, 1928 |
| 2,218,908 | Fonseca | Oct. 22, 1940 |
| 395,609 | Brangs | Jan. 1, 1889 |
| 1,790,275 | Lotz | Jan. 27, 1931 |
| 1,942,147 | Merkel | Jan. 2, 1934 |
| 2,351,426 | Healis | June 13, 1944 |
| 1,762,075 | Peterson | June 3, 1930 |
| 1,176,632 | Werner | Mar. 21, 1916 |